Dec. 8, 1959 C. FARMER 2,916,222
METHOD OF WINDING ARMATURE CORES AND APPARATUS
Filed May 26, 1955 2 Sheets-Sheet 2
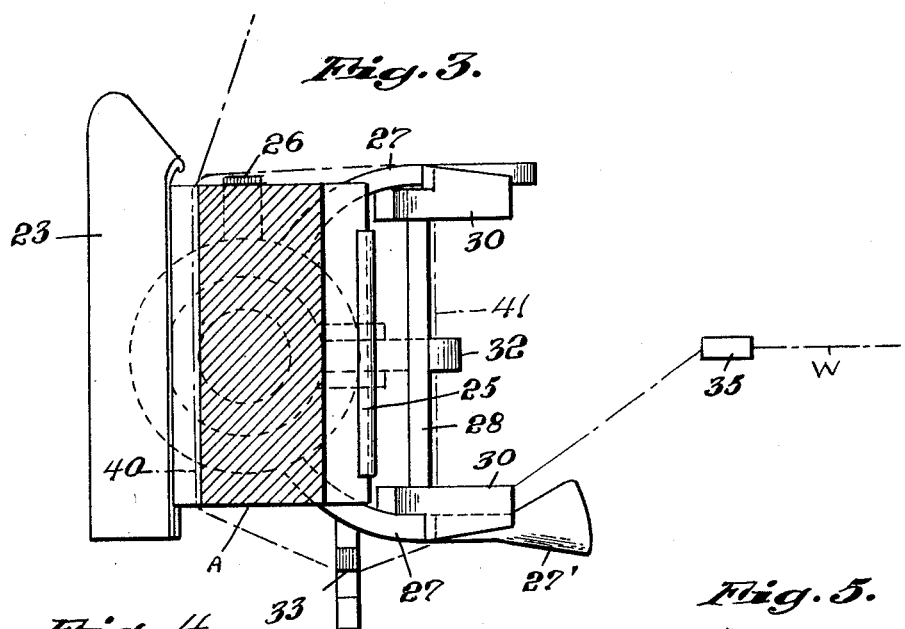
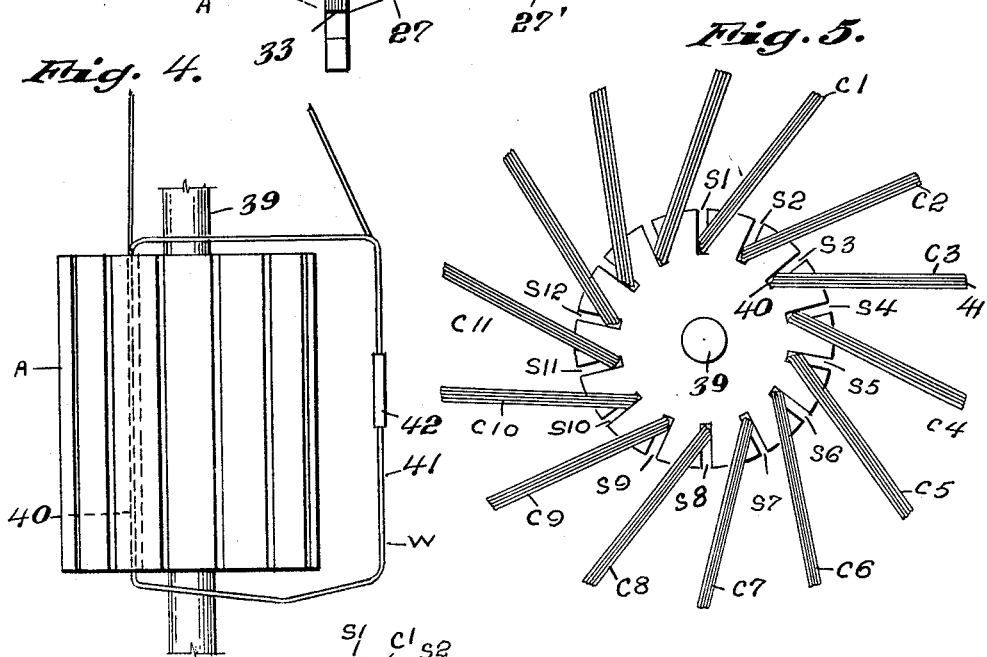
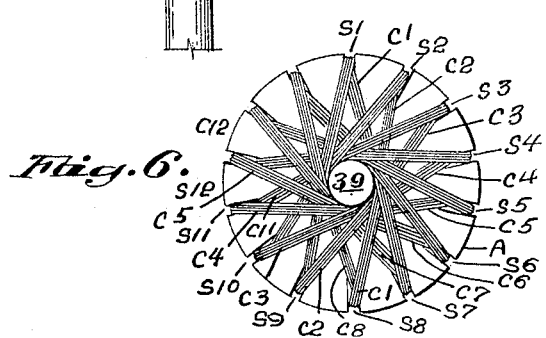
INVENTOR.
Cecil Farmer
BY
Barlow & Barlow
ATTORNEYS.

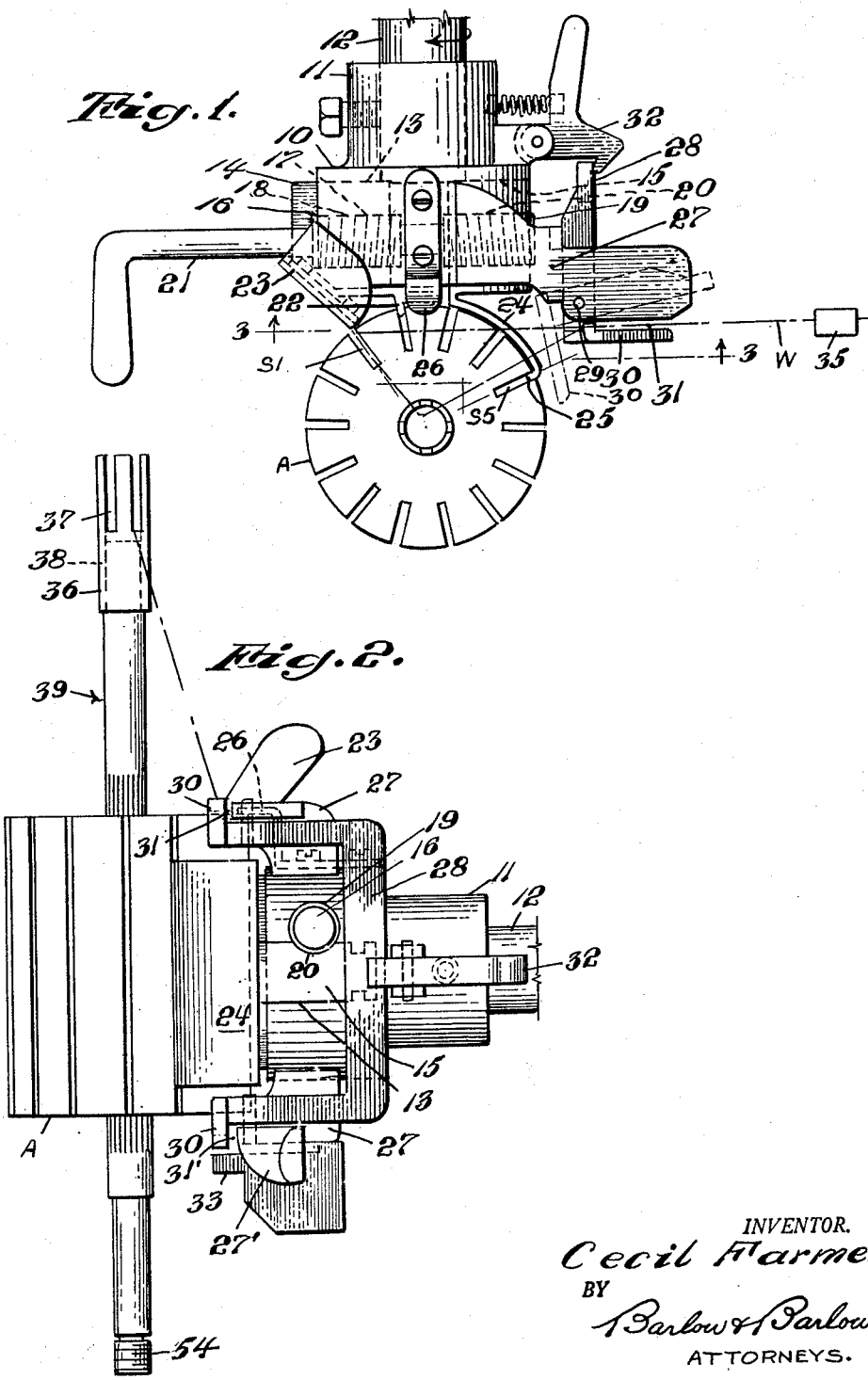

United States Patent Office 2,916,222
Patented Dec. 8, 1959

2,916,222

METHOD OF WINDING ARMATURE CORES AND APPARATUS

Cecil Farmer, Pawtucket, R.I.

Application May 26, 1955, Serial No. 511,158

11 Claims. (Cl. 242—13)

This invention relates to a method of winding electric generator and motor armatures and an apparatus adapted for carrying out the method.

An object of the invention is to provide a method of winding an armature core in a manner to result in a mechanically balanced armature.

A more specific object of the invention is to provide a method of winding an armature core wherein each coil will be wound partially in the slots of the core and partially about a support spaced from the armature core.

Another object of the invention is to provide an apparatus for carrying out the above objects and which will be adapted to be employed in connection with existing machines for winding armature cores.

With these and other objects in view, the invention consists of certain novel features of construction as will be more fully described and particularly pointed out in the appended claims.

In the accompanying drawings:

Figure 1 is a plan view of an armature winding apparatus embodying my invention;

Figure 2 is a side elevational view of the apparatus of Figure 1 as viewed from the right side of Figure 1;

Figure 3 is a sectional view taken substantially at line 3—3 of Figure 1 and showing elements of the apparatus in full lines;

Figure 4 is a plan view of an armature core illustrating an intermediate step in winding coils thereof;

Figure 5 is an end view of the armature showing the results of intermediate steps in the winding thereof;

Figure 6 is an end view of the armature showing the various coils in position in their respective slots in the core.

In carrying out the invention as applied to rewinding electric motor armatures, the armature core is first properly prepared so as to bare the same of the old wire, wedges, etc, and the walls of the slots freshly insulated when required. The winding may be started at the commutator end of the core, and the wire is directed into a slot of the armature core, thence out of the other end to be passed over a support spaced from the armature core a distance to provide a coil of a width equal to the distance between slots which the coil is to rest in. The wire is lead from the support back to the said slot and the winding is continued for the required number of turns, as by way of example four complete turns, with both ends of the wire at the commutator end to be thereafter attached to the commutator in the usual manner. In practice, the armature core is turned end upon end and the wire is drawn by this action to be directed into a slot in the core and then about the said support. The turns at the support may be taped to hold the wires at this side of the coils together. The side of the coil is now made free of the support. This forms a coil one side of which is embedded in its slot and the other side extending in space. A similar coil is wound in each of the remaining slots. Thus, at this intermediate stage of the winding, each slot has one side of a coil embedded therein and the other side of each coil extending in space. Thereafter the extending portions of the coils are folded towards the core one over the other in sequential order and the formerly free side of each coil is inserted into its respective slot to be embedded therein against the previous side of a coil formed therein. Thereafter the armature winding is completed in the known manner.

The wire may be single and/or contain a number of strands equal to the number of coils in each slot, the strands of the wire being each properly insulated one from the other. Thus, if the armature core contains fourteen slots and there is to be double that number of coils, then the wire will be doubled so as to form the required number of coils.

In Figures 1 to 3 I have illustrated an apparatus which is particularly adapted for winding armature cores in accordance with the above described method. The apparatus is in a form of a jig or fixture which may be attached to a horizontal rotatable spindle or may be substituted for the armature winding head of well-known existing machines. The apparatus accordingly comprises a cylindrical body 10 which has a bored hub 11 received on and driven by a rotatable spindle 12. The body 10 has a lateral slot 13 in which there is slidably received a pair of jaws 14 and 15 which are moved toward and from each other by means of a captive member 16. This member 16 has a right hand screw threaded portion 17 which is engaged by the jaw 14 as at 18 and a left hand screw threaded portion 19 which is engaged by the jaw 15 as at 20. A handle 21 is provided for rotating member 16. Thus, rotating the handle 21 in one direction will move the jaws toward each other. Turning the handle in the other direction will move the jaws away from each other all in the well known manner. The body 10 so far described may be referred to as a chuck having a pair of movable jaws between which the work is held.

The jaw 14 is provided with a projection 22 and a wire guide 23. The jaw 15 has an arcuate portion 24, the side edge of which terminates into a lip 25. The projection 22 is adapted to be received in a slot S2 (see Figures 1 and 5) of the armature core A and the lip 25 in a slot S5 distant from the slot S2. Thus, upon moving the jaws 14 and 15 toward each other, the armature core A will be held between the said jaws. A stop or locating abutment 26 against which one edge of the armature abuts is provided to correctly position the said armature on said body. The armature core is detachably mounted between the jaws 14 and 15 with its axis extending at right angles to the axis of spindle 12 and is thus rotatable end over end upon turning about the axis of spindle 12.

The body is also provided with a pair of oppositely disposed brackets 27 which extend on the side of the body opposite to the guide 23. A cross bar 28 having right angularly extending end fingers 30 is pivotally attached as at 29 to the brackets 27 inwardly of the free end portions thereof. As best seen in Figures 1 and 3, the end portions of each bracket 27 and fingers 30 form therebetween opposite wire receiving recesses 31 and 31' which are spaced from each other a distance substantially equal to the length of the armature core and which extend in a right angular plane with respect to the axis of spindle 12. The fingers 30 are maintained in the closed position, as seen in Figure 1, by means of a spring pressed latch 32. The end 27' of one of the brackets 27 is formed on a curvature as best seen in Figures 2 and 3 to provide a guide for directing the wire in the adjacent recess 31 as will hereinafter appear. There is also provided adjacent the end 27' an outwardly extending abutment 33 which is in the plane of the path of the wire to be wound on the core A.

In operation (Figure 1), the spindle is arranged to be rotated a predetermined number of turns and then comes to rest by means of known mechanism (not shown) and forming no part of the present invention. The wire W to be coiled is led from a supply (not shown) and through the usual tensioning means (not shown) to a guide 35 shown more or less conventionally. The free end of the wire is led to be attached to a sleeve 36 which has a slotted end 37 and is received on the reduced end portion of the commutator end 38 of the armature shaft 39. The shaft 12 may now be actuated to rotate as by way of example four turns counter-clockwise as viewed in Figure 1. The wire W which extends in the path of rotation of the core A and in line with slot S1 in said core and said recesses 31 will be engaged by the surface of guide 23 and directed thereby into slot indicated S1. During further turning of the armature core in the same direction, the wire will be laid in the said slot S1 and out at the end thereof and engaged by the abutment 33, thence by guide 27' to be directed thereby in the adjacent recess 31', thence parallel to bar 28 to enter the recess 31, the wire W being drawn from the supply in the winding operation in the obvious manner. On the next turn of the core the wire extends directly across the adjacent end of the armature core and is engaged to be directed by guide 23 to re-enter slot S1, the wind continues as above for four turns, and the spindle 12 comes to rest. Thus, the first coil is made with one side 40 thereof embedded in the lower portion of slot S1 and the other side 41 held in the recesses 31, 31'. The operator will tape the wires of the side 41 as at 42 (see Figure 4) to hold the same together. The operator may now release latch 32 to permit fingers 30 to be swung to the broken line position shown in Figure 1 so as to free the side 41 of the coil to be moved out of the way for the next coil to be wound.

The handle 21 may now be turned to open the jaws 14 and 15, and the armature is disengaged from the projection 22 and lip 25 and manually indexed by turning clockwise to engage projection 22 with slot S1 and lip 25 with slot S4. The jaws are next closed to hold the armature core in the newly indexed position. The fingers 30 are returned to closed or wire receiving position. The spindle 12 is now manually turned in the direction of the winding a distance sufficient to pass the sleeve 36 beyond the stretch of wire W extending between the guide 35 and the armature core. The operator may now without severing pull a sufficient stretch of said wire to pass the same into a slot 37. The spindle 12 may then be mechanically set in motion and the winding continues as above described to form the second coil. The above operations and motoins take place until all the slots in the core have one side 40 of a coil wound therein. There being fourteen slots in the core, there will be fourteen coils formed, as best seen in Figure 5. The armature may be removed from the apparatus and by well-known operation the extending portions of the coils are swung toward the armature core and the sides 41 are located in their respective slots; as by way of example, the side 41 of coil C1 is inserted into the opposite slot S8 to be located in the outer part of the slot against the side 40 of coil C8, coil C2 is inserted in slot S9, coil C3 in slot S10, etc. to result in the wind as shown in Figure 6. The wire loops formed by passing the wire into the slot 37 of sleeve 36 are severed at the bight thereof, which provides the leads or taps to be attached to the commutator (not shown).

From the foregoing description it will be apparent that I have disclosed a method and apparatus for winding an armature core in which one side of the coils formed is wound directly into the slots of the armature and the other side of the coils is wound about a support which is spaced from the armature core. It may be here pointed out that the armature core is shown more or less conventionally and that the slots thereof are usually provided with insulation (not shown).

It will be understood that the invention is not limited to rewinding of armatures and may be used for the original winding thereof, the process of winding being the same.

I claim:
1. The method of winding a slotted armature core which comprises the steps of winding one side of each coil directly into the slots of the armature and the other side of each coil at a location spaced from the armature core, thereafter inserting the said other side of each coil into a slot spaced from the first slot in said core.

2. The method of winding a slotted armature core which includes the steps of winding one side of each coil directly into a slot of the armature core and the other side of the coil about a support spaced from said core, thereafter inserting the said other side of each coil into its respective slot in said core.

3. The method of winding a slotted armature core which consists in winding a coil by passing the wire through a slot in the core, thence about a support spaced from the armature core, thence back through said slot to complete one turn of the coil, and continuing the winding of the coil for the required number of turns, thence releasing the side of the coil held in said support and thereafter moving the said side of the coil to a slot spaced from the first slot through which it was passed.

4. An apparatus for winding a slotted armature core comprising a body adapted to be attached to a rotatable spindle for rotation therewith, a support carried by said body and rotatable therewith and having a wire receiving recess therein positioned to guide a wire in a plane at right angles to the axis of rotation of said body, and means for detachably mounting said core on said body to position the slots thereof at right angles to the axis of rotation of said body and parallel to said plane, and guide means operable during the rotation of said body for directing a wire to be wound into a coil into a slot in said core and into said recess whereby one side of said coil will be wound in a slot in said core and the other side will be wound in the said recess.

5. An apparatus for winding a slotted armature core comprising a body adapted to be attached to a rotatable spindle for rotation therewith, a support carried by said body and rotatable therewith and having spaced wire receiving recesses therein in a plane at right angles to the axis of rotation of said body, and means for detachably mounting said core on said body to position the slots thereof at right angles to the axis of rotation of said body and parallel to said plane, and guide means operable during the rotation of said body for directing a wire to be wound into a coil into a slot in said core and into said recesses in said support whereby one side of said coil will be wound in a slot in the core and the other side of the coil will be wound in said recesses in said support.

6. An apparatus according to claim 5 wherein pivoted fingers form one wall of each of said recesses.

7. An apparatus according to claim 5 wherein said means for detachably mounting said core is clamp means engaged in spaced slots in said core.

8. The method of winding a slotted armature core which consists in winding a coil by passing the wire through a slot in the core, thence about a support spaced from the armature core, thence back through said slot to complete one turn of the coil, and continuing the winding of said coil for the required number of turns, thence releasing the side of the coil held in said support and successively similarly winding coils with a part in each of the additional slots until coils are wound for all of the slots of the core and the remainder of each coil is spaced from the core, and thereafter inserting the part of each of the coils which is spaced from the armature core into a slot spaced from the slot in the core in which one portion of the coil is located.

9. The method of winding a slotted armature core which consists in winding a coil by passing the wire through a slot in the core, thence about a support spaced from the armature core, thence back through said slot to complete one turn of the coil, and continuing the winding of said coil for the required number of turns, thence releasing the side of the coil held in said support and then without severing the wire successively similarly winding coils with a part in each of the additional slots until coils are wound for all of the slots of the core and the remainder of each coil is spaced from the core, and thereafter inserting the part of each of the coils which is spaced from the armature core into a slot spaced from the slot in the core in which one portion of the coil is located.

10. The method of winding a slotted armature core which consists in winding a coil by passing the wire through a slot in the core, thence about a support spaced from the armature core, thence back through said slot to complete one turn of the coil, and continuing the winding of said coil for the required number of turns, thence releasing the side of the coil held in said support moving said support to another slot in the core and successively similarly winding coils about the same support with a part in each of the additional slots until coils are wound for all of the slots of the core and the remainder of each coil is spaced from the core, and thereafter inserting the part of each of the coils which is spaced from the armature core into a slot spaced from the slot in the core in which one portion of the coil is located.

11. The method of winding a slotted armature core which consists in winding a coil by passing the wire through a slot in the core and continuing the winding of wire for the required number of turns and then without severing the wire successively similarly winding coils with at least a part of each coil in additional slots until the coils are wound for all of the slots of the core, and thereafter inserting the part of each which is spaced from the armature core into a slot spaced from the slot in the core in which one portion of the coil is located.

References Cited in the file of this patent

UNITED STATES PATENTS

| | | |
|---|---|---|
| 1,622,185 | Dewey | Mar. 22, 1927 |
| 1,661,331 | Gomory | Mar. 6, 1928 |
| 1,890,111 | Eaton | Dec. 6, 1932 |
| 2,503,752 | Malchus | Apr. 11, 1950 |
| 2,578,495 | Wirth | Dec. 11, 1951 |

FOREIGN PATENTS

| | | |
|---|---|---|
| 223,270 | Germany | June 10, 1910 |
| 970,427 | France | June 14, 1950 |